US007393126B2

(12) United States Patent
Naganawa et al.

(10) Patent No.: US 7,393,126 B2

(45) Date of Patent: Jul. 1, 2008

(54) VEHICLE HEADLAMP

(75) Inventors: Masahito Naganawa, Shizuoka (JP); Takehiko Tajima, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 44 days.

(21) Appl. No.: 11/344,060

(22) Filed: Feb. 1, 2006

(65) Prior Publication Data

US 2006/0171162 A1 Aug. 3, 2006

(30) Foreign Application Priority Data

Feb. 2, 2005 (JP) ......................... P. 2005-027030

(51) Int. Cl.
*B60Q 1/00* (2006.01)

(52) U.S. Cl. ......................... 362/539; 362/508; 362/514; 362/517; 362/518; 362/523

(58) Field of Classification Search ................. 362/539, 362/514, 508, 523, 517, 518, 208, 299, 346
See application file for complete search history.

(56) References Cited

U.S. PATENT DOCUMENTS

| | | | | |
|---|---|---|---|---|
| 4,851,968 | A * | 7/1989 | Nino | 362/539 |
| 4,918,580 | A * | 4/1990 | Nino | 362/539 |
| 6,435,703 | B2 * | 8/2002 | Takada | 362/517 |
| 6,454,448 | B2 * | 9/2002 | Taniuchi et al. | 362/517 |
| 6,796,696 | B2 * | 9/2004 | Taniuchi | 362/539 |

FOREIGN PATENT DOCUMENTS

JP 5-159603 A 6/1993

* cited by examiner

*Primary Examiner*—Stephen F. Husar
*Assistant Examiner*—Meghan K Dunwiddie
(74) *Attorney, Agent, or Firm*—Sughrue Mion, PLLC

(57) ABSTRACT

A headlamp for vehicle use is provided with: a light source bulb having a light source from which light is emergent; a reflector for reflecting light emergent from the light source; a sub-reflector for reflecting light, which has been reflected on the reflector, to the front side; and a projection lens for directly projecting light of the light source to the front side. These components are arranged in a light chamber composed of a lamp body and a lens cover.

16 Claims, 14 Drawing Sheets

VEHICLE HEADLAMP

The present application claims foreign priority based on Japanese Patent Application No. P.2005-027030, filed on Feb. 2, 2005, the contents of which are incorporated herein by reference.

BACKGROUND OF THE INVENTION

1. Field of the Invention

The present invention relates to a vehicle headlamp. More particularly, the present invention relates to a vehicle headlamp characterized in that: the efficiency of utilizing light emitted by a light source is high; the size of the vehicle headlamp is small; and the headlamp is capable of emitting a large quantity of light.

2. Related Art

Disclosed in JP-A-05-159603 a projector type lighting device unit that projects light to a front side of a vehicle.

The projector type lighting device unit irradiates the front side of the lighting device unit with light as follows. Light emitted by a light source, which is arranged in a vicinity on an optical axis extending in the longitudinal direction of a vehicle, is condensed and reflected by a reflector to the front side being concentrated upon the optical axis. The reflected light is irradiated to the front side of the lighting device unit via a projection lens provided in a front portion of the reflector. In the case where a light distribution pattern having a cutoff line in an upper end portion is formed by the lighting device unit, a shade is arranged in a vicinity of a rear side focus of the projection lens. A portion of the reflected light sent from the reflector is shaded by the shade so that the cutoff line is formed.

However, in the vehicle headlamp of JP-A-05-159603, the light emitted by the light source is once reflected by the reflector before the light is incident upon the projection lens, and the reflected light is condensed and incident upon the projection lens. Therefore, when the light is reflected on the reflector, a luminous intensity of the light is attenuated and a quantity of light is reduced. In addition, in the vehicle headlamp of JP-A-05-159603, the light, which is emergent from the light source and reflected on a lower half portion of the reflector, is shaded by the shade for forming the cutoff line. Therefore, only a substantial half of the quantity of the light incident upon the reflector is projected by the projection lens at the most. Accordingly, the efficiency of utilizing light emitted by the light source is low in the vehicle headlamp. It can be said that the light emitted by the light source is not effectively utilized.

SUMMARY OF THE INVENTION

One or more embodiments of the present invention provide a vehicle headlamp in which an efficiency of utilizing light emitted by a light source is high; the size of the vehicle headlamp is small; and the vehicle headlamp can emit a large quantity of light.

In accordance with one or more embodiments of the present invention, a vehicle headlamp is provided with a light source bulb including a light source for emitting light; a reflector for reflecting the light from the light source; a sub-reflector for reflecting light, which has been reflected by the reflector, onto a front side; and a projection lens for directly projecting the light from the light source onto the front side.

Moreover, in accordance with one or more embodiments of the present invention, the vehicle headlamp may be further provided with a shade, for shading a part of the light emitted by the light source, provided on the light source bulb. The shade is arranged in a vicinity of a rear side focus of the projection lens.

Moreover, in accordance with one or more embodiments of the present invention, the shade may include an inclined portion corresponding to a shape of an inclined portion on a cutoff line of a light distribution pattern projected onto the front side.

Moreover, in accordance with one or more embodiments of the present invention, a longitudinal direction of the light source bulb may be substantially parallel with a width direction of a vehicle.

Moreover, in accordance with,one or more embodiments of the present invention, the light source may be positioned on a central axis of the projection lens.

Moreover, in accordance with one or more embodiments of the present invention, the vehicle headlamp may be further provided with a reflector support member provided in a lower portion of the reflector; and an opening formed in the reflector support member. A reflecting face of the reflector has a first focus at a position in a vicinity of the light source and a second focus in a vicinity of the opening.

Moreover, in accordance with one or more embodiments of the present invention, the light source bulb may be inclined with respect to the vehicle width direction.

Moreover, in accordance with one or more embodiments of the present invention, a longitudinal direction of the light source bulb may be inclined to an upper side at a predetermined angle with respect to a horizontal face including the vehicle width direction, and the predetermined angle may correspond to an angle of inclination of an inclined portion on a cutoff line of a light distribution pattern projected onto the front side.

Moreover, in accordance with one or more embodiments of the present invention, the sub-reflector may have an oblique cutoff line formation face for forming an inclined portion on a cutoff line, which is projected onto the front side, by obliquely reflecting an image of the light source.

Moreover, in accordance with one or more embodiments of the present invention, the vehicle headlamp may be further provided with a reflector support member provided in a lower portion of the reflector; and a first opening and a second opening both formed in the reflector support member. A reflecting face of the reflector includes a first reflecting region having a focus in a vicinity of the first opening, and a second reflecting region having a focus in a vicinity of the second opening.

According to the headlamp of one or more embodiments of the present invention, light emitted by the light source is not reflected by the reflector but directly irradiated to the front side via the projection lens. Therefore, a luminous intensity of light is not attenuated on the reflecting face of the reflector. Accordingly, it becomes possible to irradiate a large quantity of light to the front side. Further, according to the vehicle headlamp of one or more embodiments of the present invention, not only light is irradiated to the front side via the projection lens but also the light incident upon the reflector is reflected to the sub-reflector and irradiated to the front side by the sub-reflector. Therefore, it is possible to recover the light, which is not incident upon the projection lens, and to project it to the front side. Due to the foregoing, it is possible to compose a vehicle headlamp in which the light emergent from the light source can be recovered as much as possible so as to enhance the utilizing efficiency and an optical system, the light quantity of which is large, is composed.

In addition, according to the headlamp of one or more embodiments of the present invention, the reflector is not needed for the component to compose the optical system which guides light to the projection lens. Accordingly, it is possible to shorten the length of a lighting device unit in the longitudinal direction of a vehicle. Therefore, the size of the vehicle headlamp can be reduced. Even in the case where the reflector is provided in the lighting device, when the position of the second focus is located at a position under the position of the first focus, it is possible to shorten the length of the reflector in the longitudinal direction of the vehicle. Due to the foregoing, even in the case where the reflector is provided in the lighting device, it is possible to propose a vehicle headlamp, the length in the longitudinal direction of which is shorter than that of the conventional vehicle headlamp.

Further, in the structure, light incident upon the projection lens is directly incident upon the projection lens without being reflected on the reflector. Accordingly, it is possible to reduce the size of the shade. Light incident upon the reflector is not shaded by the shade but reflected toward the sub-reflector. After that, the light is irradiated to the front side being reflected by the sub-reflector. Accordingly, an area exclusively occupied by the shade can be remarkably reduced as compared with that of the conventional structure. Further, light not incident upon the projection lens can be recovered and projected to the front side. Due to the foregoing, it is possible to,compose a vehicle headlamp in which the light emergent from the light source can be recovered as much as possible so as to enhance the utilizing efficiency and compose an optical system, the light quantity of which is large.

In addition, in the vehicle headlamp of one or more embodiments of the present invention, a shade for shading a portion of the light emitted by the light source may be arranged on the light source bulb.

The shape may have an inclined portion, the shape of which corresponds to the shape of the cutoff line of the light distribution pattern projected to the front side. In this case, it is possible to form a light distribution pattern having a cutoff line in which an inclined portion is formed when light emitted by the light source is appropriately shaded by the shade.

In the case of a light source bulb having a shade in which no inclined portion is formed, the light source bulb may be obliquely attached. Even in this case, it is possible to form a light distribution pattern having a cutoff line in which an inclined portion is provided.

It is possible to form an oblique cutoff line formation face on the sub-reflector and to form a light distribution pattern having a cutoff line in which an inclined portion is formed by light reflected by the oblique cutoff line formation face.

Other aspects and advantages of the invention will be apparent from the following description and the appended claims.

DESCRIPTION OF THE PREFERRED EMBODIMENTS

Embodiments of the invention will be described with reference to the accompanying drawings.

First Embodiment

First, explanations will be made into a vehicle head lamp according to a first embodiment of the present invention.

Figure 1:
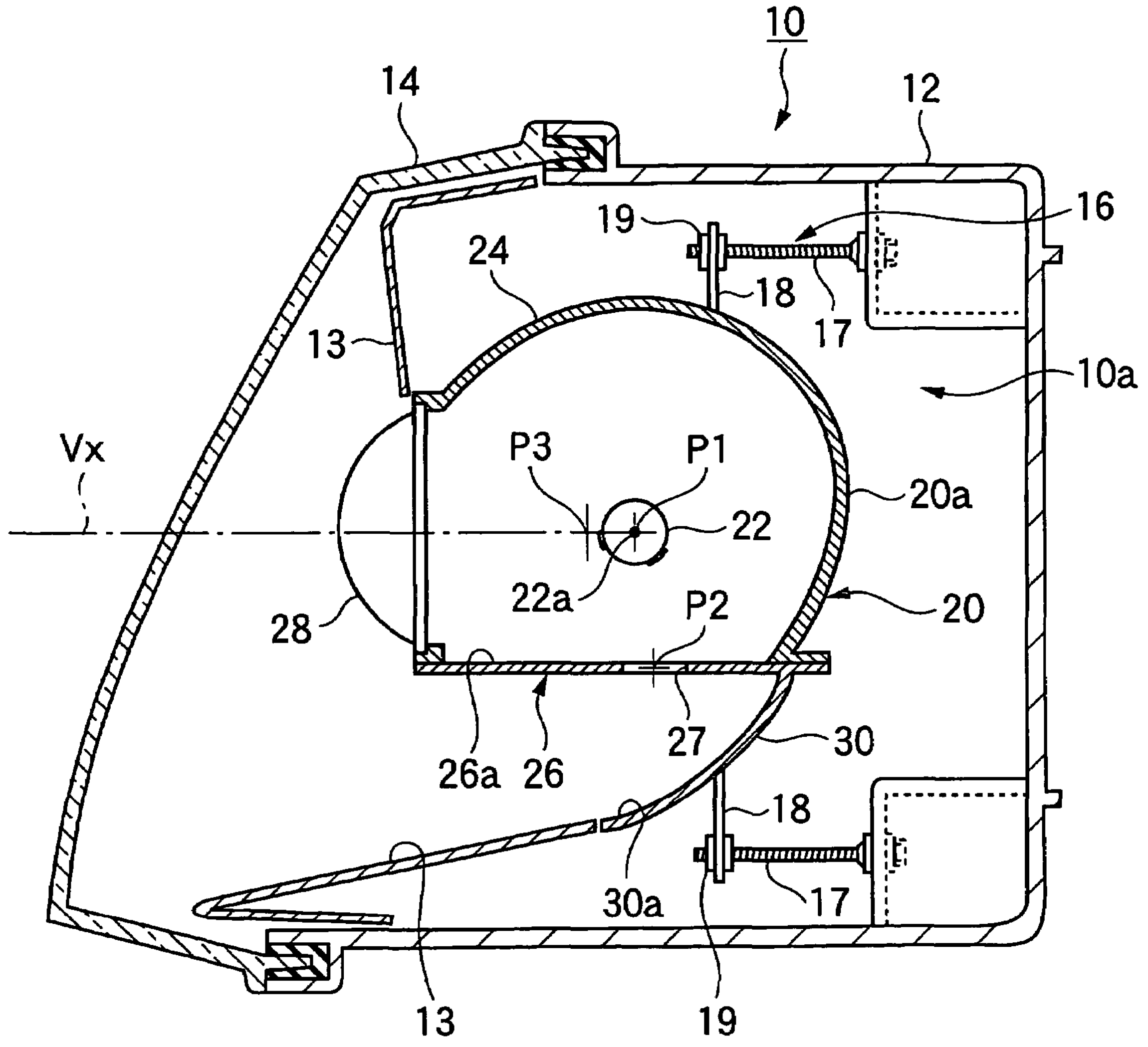
FIG. 1 is a sectional view showing a vehicle headlamp of a first embodiment of the present invention.
Figure 2:
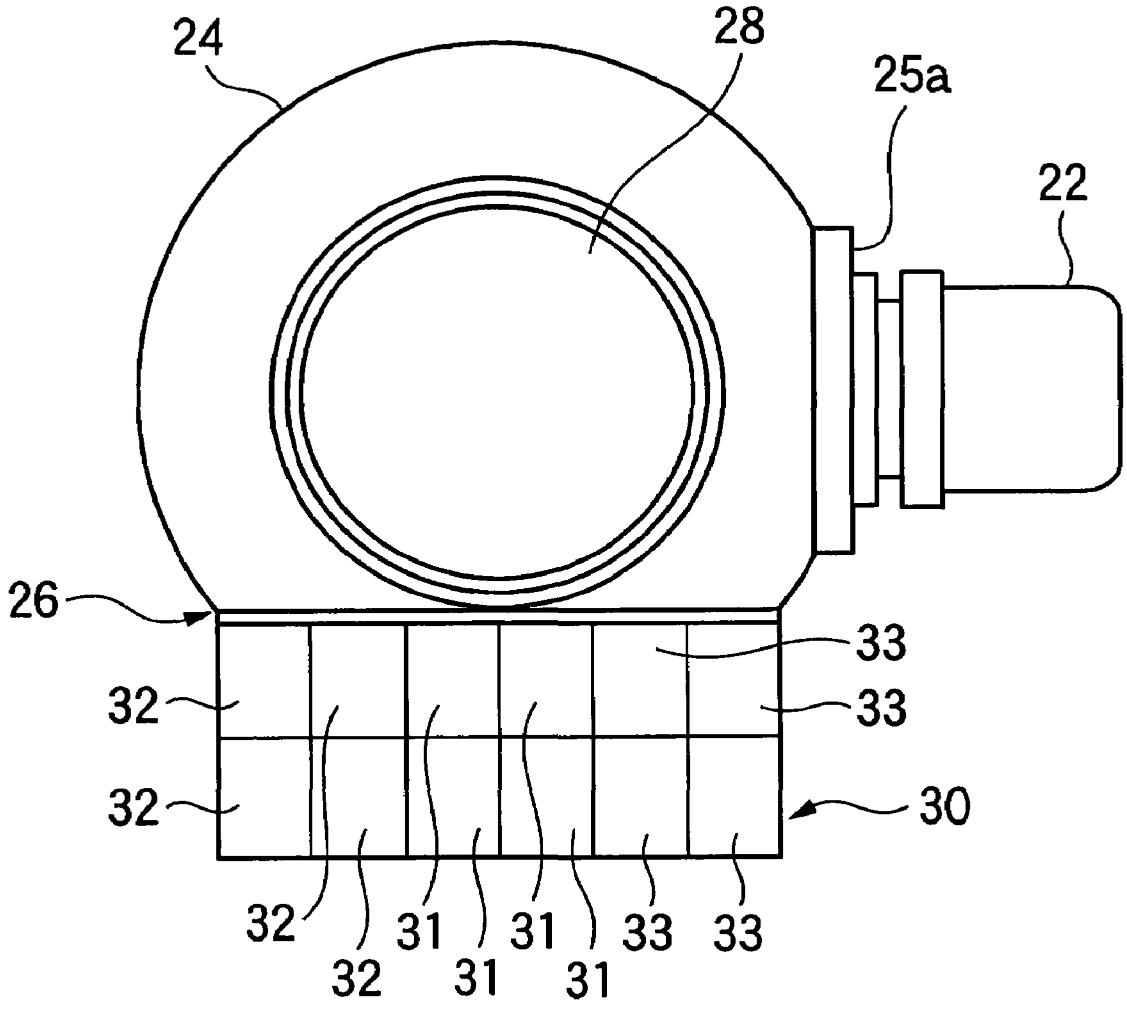
FIG. 2 is a front view showing a lighting device unit of the first embodiment.
Figure 3:
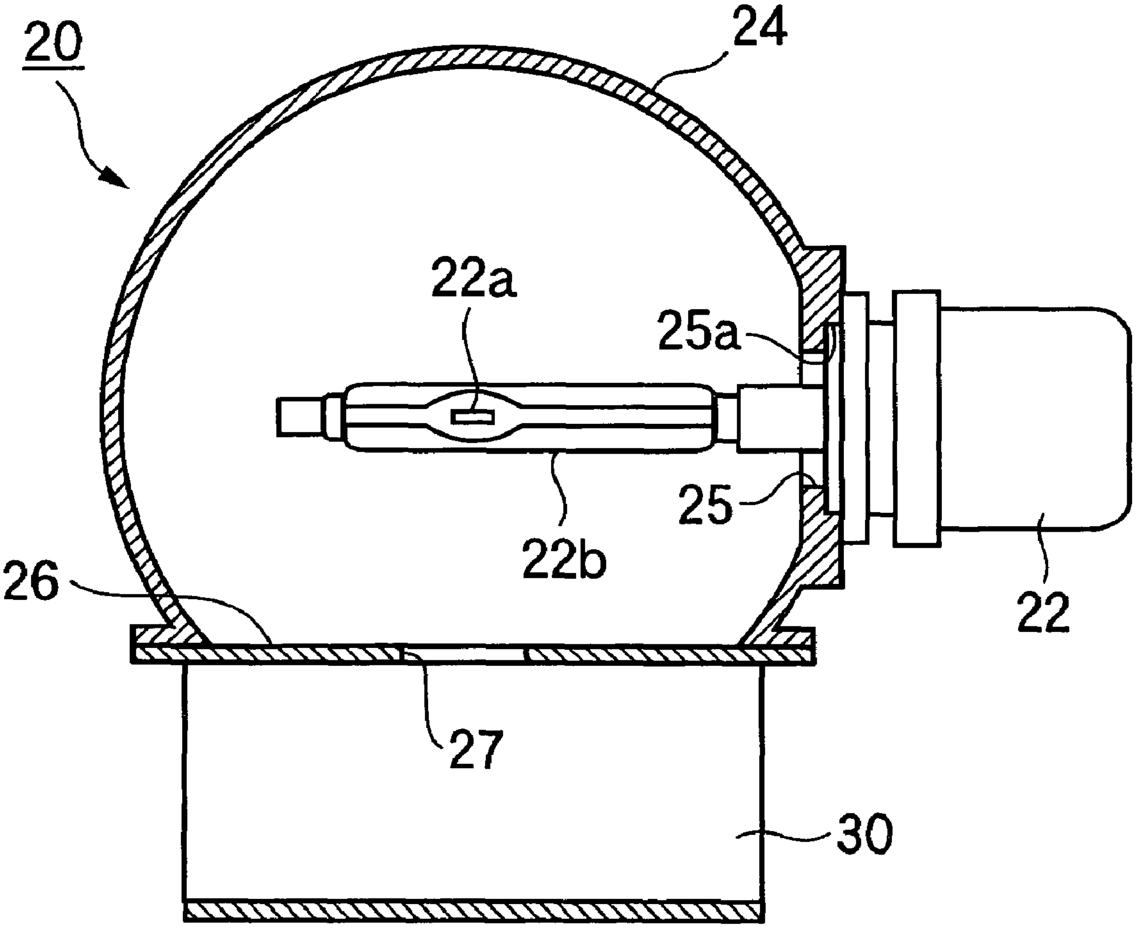
FIG. 3 is a laterally sectional view showing the lighting device unit of the first embodiment.
Figure 4:
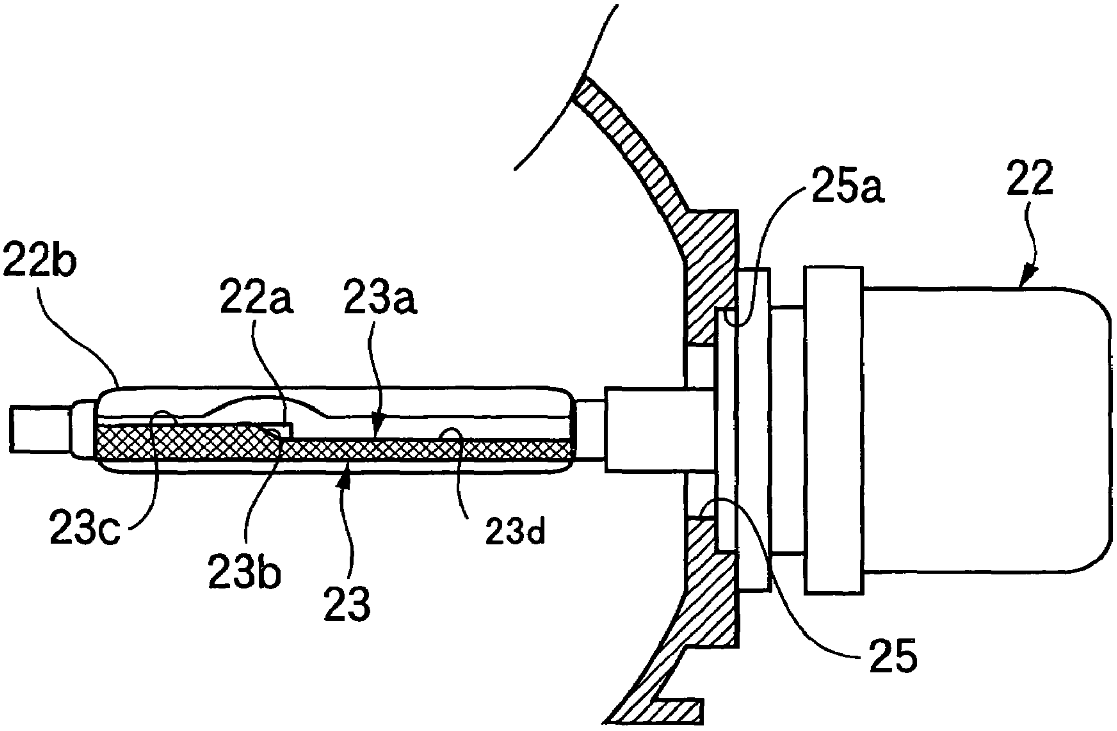
FIG. 4 is a partially enlarged view of a light source bulb of the first embodiment.
Figure 5:
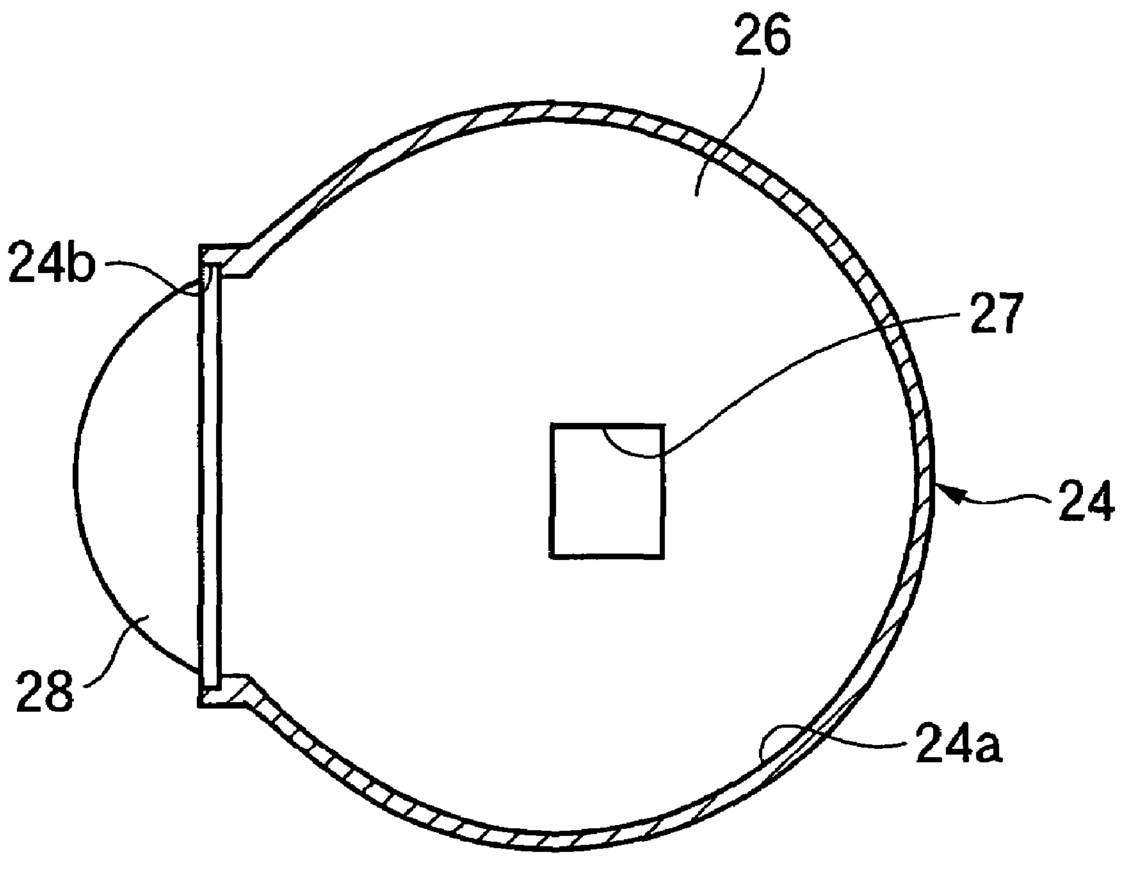
FIG. 5 is a horizontally sectional view of the light source bulb of the first embodiment.
Figure 6:
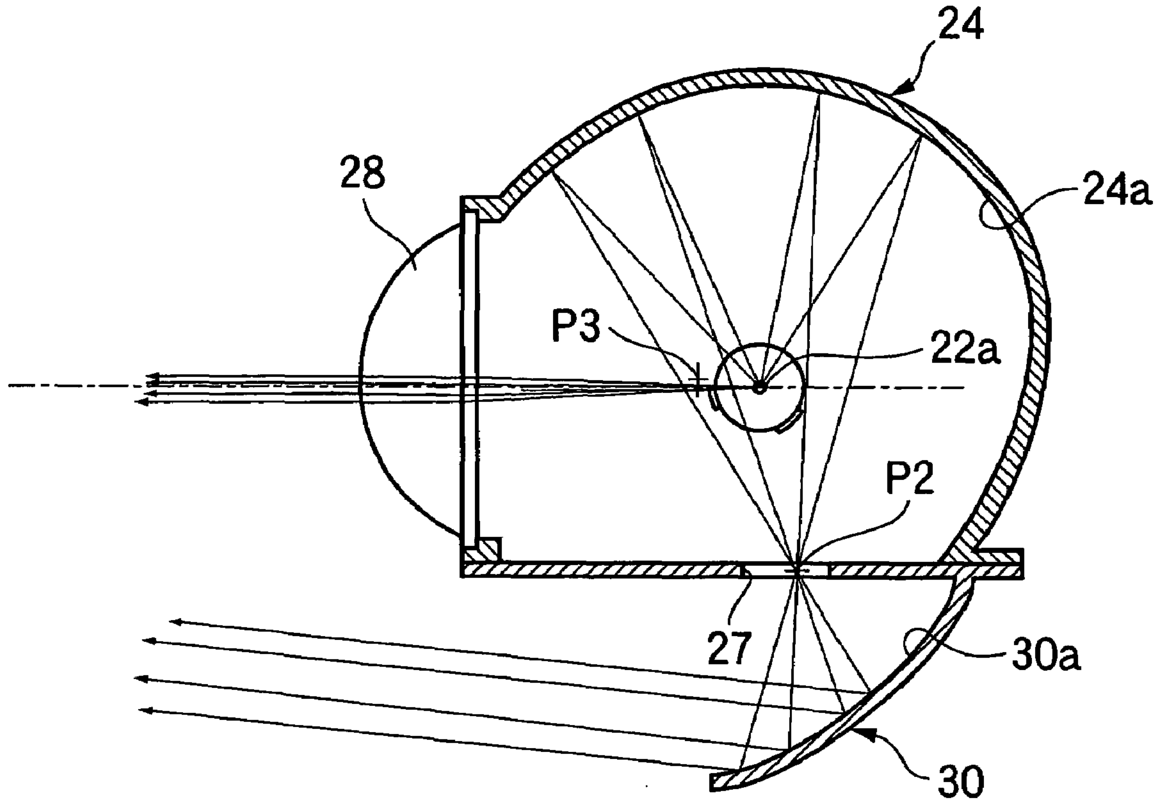
FIG. 6 is a view showing an optical path of light emergent from the lighting device unit of the first embodiment.

FIG. 1 is a sectional view showing a vehicle headlamp of the present embodiment, FIG. 2 is a front view showing a lighting device unit, FIG. 3 is a laterally sectional view showing the lighting device unit, FIG. 4 is a partially enlarged view of the light source bulb, FIG. 5 is a horizontally sectional view of the light source bulb, FIG. 6 is a view showing an optical path of light sent from the lighting device unit, and FIGS. 7A to 7E are schematic illustrations showing a light distribution pattern of light projected by the vehicle headlamp.

The headlamp 10 for vehicle use of this embodiment is composed as follows. There is provided a lighting device unit 20 for emitting light into the lighting chamber 10*a* which is defined by the lamp body 12 and the cover 14 having a light transmitting property attached to the lamp body 12 so that the cover 14 can cover a front face opening of this lamp body 12. In the periphery of the lighting unit 20, the extension 13 is arranged.

The lighting device unit 20 is tiltably attached to the lamp body 12 via the aiming mechanism 50. The aiming mechanism 50 is composed in such a manner that one end portions of a plurality of aiming screws 17, 17 are attached to the brackets 18, 18, which are provided on the outer surface 20*a* of the lighting device unit 20, via the nuts 19, 19 and the other end portions of the plurality of aiming screws 17, 17 are fixed to the lamp body 12 side. This aiming mechanism 50 provided for making a fine adjustment of the attaching angle of the lighting device unit 20 with respect to the lamp body 12. When the attaching angle of the lighting device unit 20 is finely adjusted, an optical axis of light emergent from the lighting device unit 20 can be adjusted.

The lighting device unit 20 is a mono-focus projector type lighting device unit. As shown in FIG. 2, the lighting device unit 20 includes a light source bulb 22, a reflector 24, a reflector support member 26, a projection lens 28 and a sub-reflector 30.

As shown in FIG. 3, the light source bulb 22 is a discharging bulb such as a metal halide bulb. In this discharging bulb, light is emitted by the light source 22*a* composed of a discharging light emitting portion provided inside the bulb tube 22*b*. As shown in the enlarged view of FIG. 4, on the bulb tube 22*b* of this light source bulb 22, the shade 23 is fixed which shades a portion of light emitted by the light source 22*a*.

This shade 23 includes an upper end edge 23*a*, the shape of which corresponds to the shape of the cutoff line of the light distribution pattern irradiated to the front side. Specifically, as shown in FIG. 4, the upper end edge 23*a* of the shade 23 includes: an inclined portion 23*b* having an end edge inclined with respect to the axial direction of the light source bulb 22; and horizontal portions 23*c*, 23*d*, which are continuously provided at both end portions of the inclined portion 23*b*, having end edges substantially parallel with the axial direction of the light source bulb 22. In this embodiment, the inclined portion 23*b* is positioned in the radial direction of the light source 22*a* of the light source bulb 22.

As shown in FIG. 1, the reflector 24 is a reflecting member having a substantially ellipsoidal reflecting face 24*a* inside. The reflector 24 reflects light, which is emergent from the light source 22*a* of the light source bulb 22 provided inside the reflector 24, by the reflecting face 24*a* on the inner diameter side. In the reflector 24, the opening 24*b*, the sectional shape of which is substantially circular, is formed on the front side. The projection lens 28 is attached to the reflector 24 so that this opening 24*b* can be covered with the projection lens 28.

As shown in FIGS. 2 and 3, on the side wall of the reflector 24, the attaching hole 25 for attaching the light source bulb 22 is formed. The attaching hole 25 is formed in the direction substantially parallel with the width direction of a vehicle penetrating the reflector 24 from the outer diameter side to the inner diameter side of the reflector 24. The light source bulb 22 is inserted from the outside of the reflector 24 to the inside reflecting face 24*a* side through the attaching hole 25. The light source bulb 22 is fixed to the holder 25*a* formed in the periphery of the attaching hole 25.

As a result, as shown in FIG. 3, the light source bulb 22 is fixed along the penetrating direction of the attaching hole 25 so that the longitudinal direction (the axial direction) of the light source bulb 22 can be substantially parallel with the width direction of a vehicle. The light source 22*a* is positioned on the central axis $V_x$ of the projection lens 28. This light source 22*a* is fixed at a position in the vicinity of the first focus P1 in the case where the shape of the reflecting face 24*a* of the reflector 24 is approximated by an ellipsoid.

The projection lens 28 directly projects light emergent from the light source 22*a* of the light source bulb 22 provided in the reflector 24. As shown in FIG. 1, the projection lens 28 is positioned so that the rear focus P3 of the projection lens 28 can be located at a position in the vicinity of the inclined portion 23*b* of the shade 23. Light projected by the projection lens 28 via the vicinity of the rear focus P3 of the projection lens 28 is irradiated to the front side substantially in parallel with the rotary central axis $V_x$ as shown in FIG. 6.

The reflector support member 26 is provided in a lower portion of the reflector 24. The reflector support member 26 is fixed to a lower end face of the reflector 24 in such a manner that the reflector support member 26 closes a lower portion of the reflector 24 with the base body 26*a*, the shape of which is formed into a substantially elliptical plate shape corresponding to the lower end face of the reflector 24. The sub-reflector 30 protruding from the base body 26*a* is formed being integrated with the reflector support member 26.

The sub-reflector 30 is a reflecting member for reflecting light, which has been reflected by the reflecting face 24*a* of the reflector 24, to the front side. An opening 27 is formed in the base body 26*a* of the reflector support member 26. A second focus P2 of the reflector 24 is positioned in the vicinity of this opening 27. Light reflected on the reflecting face 24*a* of the reflector 24 is condensed in the vicinity of the second focus P2 close to this opening 27 and incident upon the sub-reflector 30 and reflected by the sub-reflector 30 to the front side.

As shown in FIG. 2, the sub-reflector 30 has twelve reflecting faces 31 to 33. In this case, the same numeral is attached to the reflecting, face, the function of which is the same. Four reflecting faces 31, which are located in the central portion, are reflecting faces for projecting light under the condition that the light is somewhat diffused. A light distribution pattern made by four reflecting faces 32, which are provided being adjacent on one side of the reflecting faces 31, is overlapped on the light distribution pattern made by the reflecting faces 31. Further, a light distribution pattern made by four reflecting faces 33, which are provided being adjacent on the other side of the reflecting faces 31, is overlapped on the light distribution pattern made by the reflecting faces 31.

Next, the light distribution pattern projected to the front side by the headlamp 10 for vehicle use of this embodiment will be specifically explained below. The light distribution pattern of this embodiment corresponds to a left light distribution in the case where a vehicle is driven on the left.

Figure 7A:
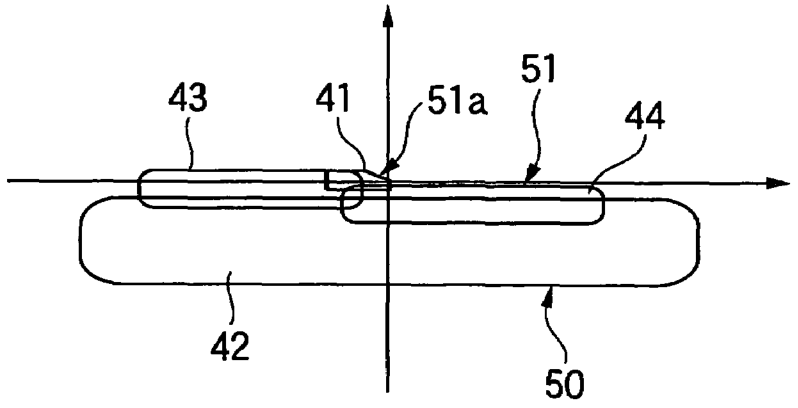
FIG. 7A is a schematic illustration showing an overall light distribution pattern of light projected by the vehicle headlamp of the first embodiment.

In this embodiment, as shown in FIGS. 7B to 7E, the overall light distribution pattern 50 shown in FIG. 7A is formed mainly by four light distribution patterns 41 to 44.

Figure 7B:
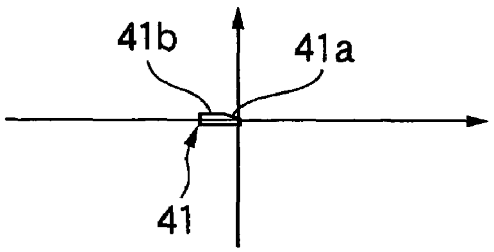
FIG. 7B is a schematic illustration showing a first light distribution pattern in the light distribution pattern.

First of all, the first light distribution pattern 41 shown in FIG. 7B is formed by light which is emergent from the light source 22*a* and passes through the vicinity of the rear focus P3 of the projection lens 28 and is incident upon the projection lens 28 and projected to the front side. This first light distribution pattern 41 is irradiated right above the horizontal line H crossing it,and a hot zone is formed. The first light distribution pattern 41 has an upper end shape corresponding to the shape of the upper end edge 23*a* of the shade 23. In -the first light distribution pattern 41, the horizontal line 41*b* corresponding to the horizontal portions 23*c*, 23*d* and the oblique line 41*a* corresponding to the inclined portion 23*b* are formed. Since light emitted by the light source 22*a* is incident upon the projection lens 28 without the attenuation of luminous intensity, the maximum luminous intensity of this light distribution pattern 41 is so high and it is 10000 to 100000 cd at the maximum. Therefore, the condensed light for enhancing the brightness of the hot zone is made.

Figure 7C:
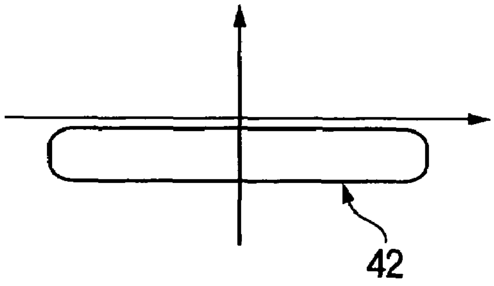
FIG. 7C is a schematic illustration showing a second light distribution pattern in the light distribution pattern.

Next, the second light distribution pattern 42 shown in FIG. 7C is formed by light irradiated by the reflecting face 31 of the sub-reflector 30. The reflecting face 31 of the sub-reflector 30 is formed into a face shape, the diffusion ratio of which is high so that the light can be diffused under the cutoff line and a large light distribution pattern can be formed. Due to the foregoing, the second light distribution pattern is formed into a light distribution pattern spreading in the width direction in a portion lower than the cutoff line 51.

Figure 7D:
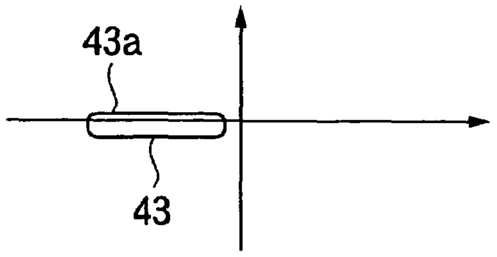
FIG. 7D is a schematic illustration showing a third light distribution pattern in the light distribution pattern.

Next, the third light distribution pattern 43 shown in FIG. 7D is formed by the light irradiated by the reflecting face 32 of the sub-reflector 30. The diffusion ratio of the reflecting face 32 of the sub-reflector 30 is set at a value lower than the diffusion ratio of the reflecting face 31. Further, the projection is made to the front side so that the upper edge 43*a* can be extended in the horizontal direction continuously to the left end portion of the horizontal line 41*b* of the light distribution pattern 41.

Figure 7E:
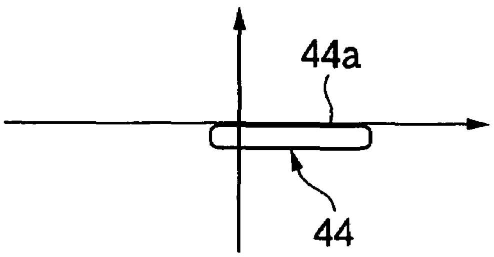
FIG. 7E is a schematic illustration showing a fourth light distribution pattern in the light distribution pattern.

Next, the fourth light distribution pattern 44 shown in FIG. 7E is formed by light irradiated by the reflecting face 33 of the sub-reflector 30. The diffusion ratio of the reflecting face 33 of the sub-reflector 30 is set at a value lower than the diffusion ratio of the reflecting face 31. Further, the projection is made to the front side so that the upper edge 44*a* can be extended in the horizontal direction continuously to the right end portion of the light distribution pattern 41.

As described above, in this embodiment, when the first to the fourth light distribution pattern 41 to 44 are overlapped on each other, the light distribution pattern 50 shown in FIG. 7A is formed. In this light distribution pattern 50, the clear cutoff line 51 having the inclined portion 51*a* can be formed by the inclined portion 41*a* and the horizontal line 41*b* of the first light distribution pattern 41, and by the upper end edge 43*a* of the third light distribution pattern 43 and by the upper end edge 44*a* of the fourth light distribution pattern 44. A quantity of light in the vicinity of the inclined portion 51*a* of the cutoff line 51 is enhanced by the first light distribution pattern 41. Therefore, the visibility to visualize a distant object can be enhanced.

As explained above, the headlamp 10 for vehicle use of this embodiment includes: a light source bulb 22 having a light source 22*a* from which light is emergent; a reflector 24 for reflecting light emergent from the light source 22*a*; a sub-reflector 30 for reflecting light reflected on the reflector 24; and a projection lens 28 for directly projecting light of the light source to the front side, wherein these light source bulb 22, reflector 24, sub-reflector 30 and projection lens 28 are arranged in the light chamber 10*a* composed of the lamp body 12 and the lens cover 14.

As described above, according to the headlamp 10 of the present embodiment, light emitted by the light source 22*a* is not reflected by the reflector but directly irradiated to the front side via the projection lens 28. Therefore, light is not attenuated on the reflecting face of the reflector. Accordingly, it becomes possible to irradiate a large quantity of light to the front side. Further, according to the headlamp 10 of the present embodiment, not only light is irradiated to the front side via the projection lens 28 but also the light incident upon the reflector 24 is reflected to the sub-reflector 30 and irradiated to the front side by the sub-reflector 30. Therefore, it is possible to recover the light which is not incident upon the projection lens 28, and it is possible to project it to the front side. Due to the foregoing, it is possible to compose a vehicle headlamp in which the light emergent from the light source can be recovered as much as possible so as to enhance the utilizing efficiency and compose an optical system, the light quantity of which is large.

According to the headlamp 10 of the present embodiment, the reflector is not needed for the component to compose the optical system which guides light to the projection lens 28. Accordingly, it is possible to shorten the length of the lighting device unit 20 in the longitudinal direction of a vehicle and the size of the headlamp 10 for vehicle use can be reduced. In this embodiment, the reflector 24 is provided in the lighting device, however, when the position of the second focus P2 is located at a position under the position of the first focus P1, it is possible to shorten the length of the reflector 24 in the longitudinal direction of the vehicle. Due to the foregoing, even in the case where the reflector 24 is provided in the lighting device, it is possible to propose a headlamp 10 for vehicle use, the length in the longitudinal direction of which is shorter than that of the conventional vehicle headlamp.

In the headlamp 10 of the present embodiment, the shade 23 for shading a portion of the light emergent from the light source 22*a* is arranged on the light source bulb 22*b*, and the shade 23 is located in the vicinity of the rear focus P3 of the projection lens 28. Further, the shade 23 has an inclined portion 23*b*, the shape of which corresponds to the shape of the cutoff line of the light distribution pattern projected to the front side. Accordingly, it is possible to form a light distribution pattern in which the light emergent from the light source 22*a* is appropriately shaded by the shade 23 and the inclined portion is formed on the cutoff line.

In the head lamp 10 for vehicle use of the present embodiment, light incident upon the projection lens 28 is directly incident upon the projection lens 28 without reflecting on the reflector 24. Therefore, when the shade 23 is arranged in the vicinity of the light source 22*a*, the size of the shade 23 can be reduced. Light incident upon the reflector 24 is not interrupted by the shade 23 but reflected toward the sub-reflector 30 and then irradiated to the front side. Accordingly, an area exclusively occupied by the shade 23 can be remarkably reduced as compared with that of the conventional structure. Further, light not incident upon the projection lens 28 can be recovered and projected to the front side. Due to the foregoing, it is possible to compose a headlamp 10 for vehicle use in which the light emergent from the light source 22*a* can be recovered as much as possible so as to enhance the utilizing efficiency and compose an optical system, the light quantity of which is large.

Second Embodiment

Next, referring to FIGS. 8, 9, 10A and 10B, a vehicle headlamp of a second embodiment of the present invention will be explained below.

Figure 8:
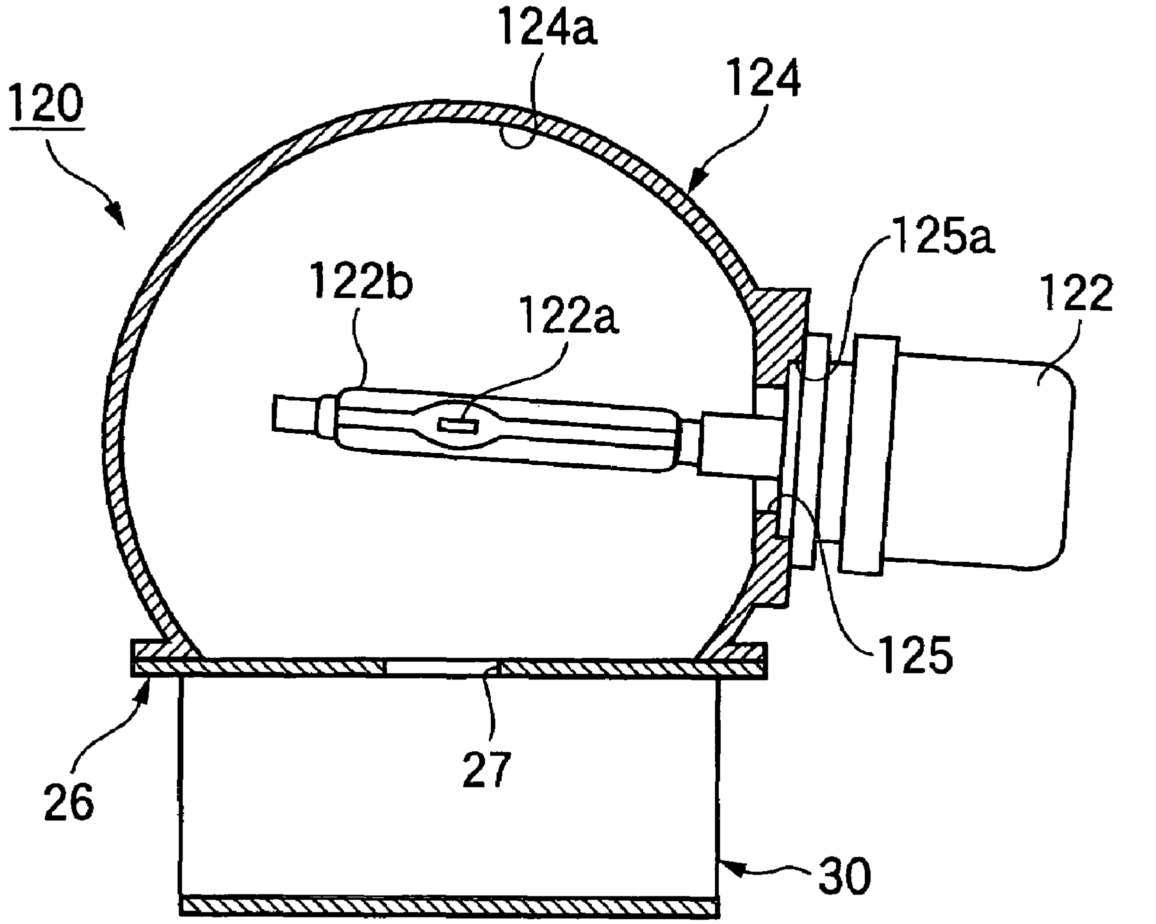
FIG. 8 is a laterally sectional view showing a lighting device unit of a second embodiment of the present invention.
Figure 9:
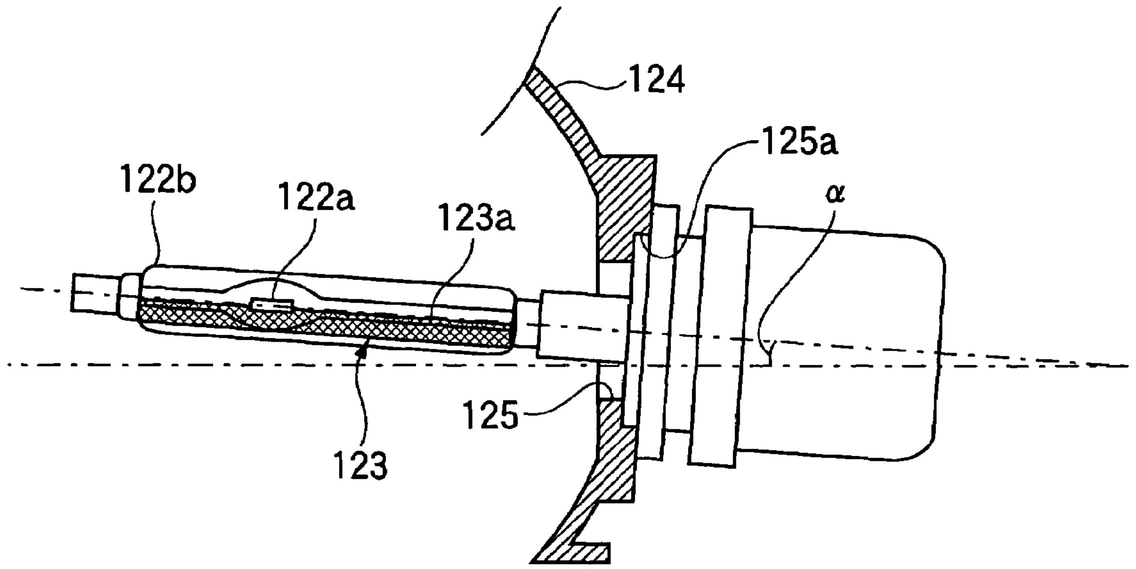
FIG. 9 is an enlarged view of a light source bulb of the second embodiment.
Figure 10A:
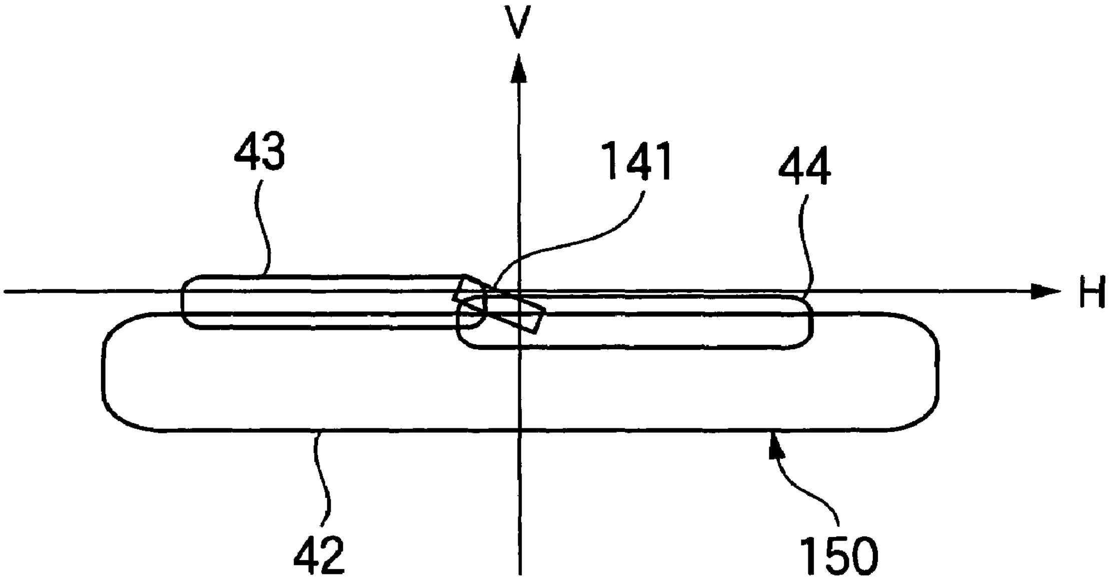
FIG. 10A is a schematic illustration showing an overall light distribution pattern of light projected to the front side from the lighting device unit of the second embodiment.
Figure 10B:
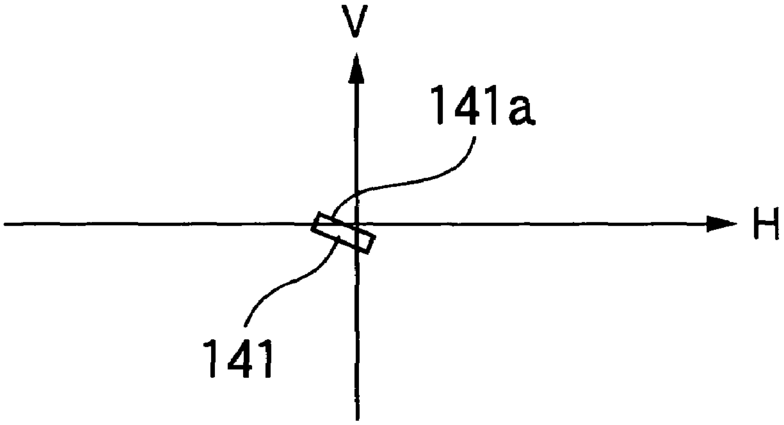
FIG. 10B is a schematic illustration showing a light distribution pattern projected from the projector lens.

FIG. 8 is a laterally sectional view of the lighting device unit of this embodiment, FIG. 9 is an enlarged view of the light source bulb of the present embodiment, and FIGS. 10A and 10B are schematic illustrations of the light distribution pattern projected to the front side. Except for the point that the method of attaching the light source bulb is different, the headlamp of this embodiment is the same as that of the first embodiment. Therefore, like reference characters are used to indicate like parts in the first and the second embodiment and the duplicated explanations are omitted here.

The vehicle headlamp of this embodiment includes a lighting device unit 120 in which the light source bulb 122 and the reflector 124 are provided instead of the light source bulb 22 and the reflector 24 of the first embodiment.

The light source bulb 122 is a discharging bulb such as a metal halide bulb. In this discharging bulb, light is emitted by the light source 122*a* composed of a discharging light emitting portion provided inside the bulb tube 122*b*. As shown in the enlarged view of FIG. 10, on the bulb tube 122*b* of this light source bulb 122, the shade 123 is fixed which shades a portion of light emitted by the light source 122*a*.

This shade 123 includes an upper end edge 123*a*, the shape of which corresponds to the shape of the cutoff line of the light distribution pattern irradiated to the front side. In this embodiment, the upper end edge 123*a* of the shade 123 is formed so that it can be substantially parallel with the axial direction of the light source bulb 122.

The reflector 124 is a reflecting member having a substantially ellipsoidal reflecting face 124*a* inside. The reflector 124 reflects light, which is emergent from the light source 122*a* of the light source bulb 122 provided inside the reflector 124, by the reflecting face 124*a* on the inner diameter side.

As shown in FIG. 8, on the side wall of the reflector 124, the attaching hole 125 for attaching the light source bulb 122 is formed. The attaching hole 125 is formed penetrating the reflector 124 from the outer diameter side to the inner diameter side of the reflector 124. The light source bulb 122 is inserted from the outside of the reflector 124 to the inside reflecting face 124*a* side through the attaching hole 125. In the periphery of the attaching hole 125, the holder 125*a* for fixing the light source bulb 122 is formed.

The holder 125*a* holds the light source bulb 122 so that the longitudinal direction (the axial direction) of the light source bulb 122 can form an angle of α (a predetermined angle) to the upper side with respect to the horizontal face including the width direction of a vehicle. Due to the foregoing, the upper end edge 123*a* of the shade 123 of the light source bulb 122 can be inclined by the angle of α with respect to the horizontal face.

Since the light source bulb 122 is inclined, the light emergent from this light source 122*a* is projected by the projection lens 28 while an image of the light source 122*a* is being inverted under the condition that the image is inclined. Accordingly, as shown in FIG. 10B, the light distribution pattern 141 formed by this projection lens 28 is projected to the front side by the shape in which the upper end edge 141*a* is inclined. As shown in FIG. 10A, this upper end edge 141*a* becomes an inclined portion 151*a* of the cutoff line 151 in the entire light distribution pattern 150. Therefore, an angle of inclination of the inclined portion 151*a* corresponds to the angle α of the inclination of the light source bulb 122.

As explained above, even when the shade 23, the shape of which corresponds to the shape of the cutoff line, is provided in the light source bulb 122 like the first embodiment, it is possible to form an inclined portion of the cutoff line when the light source bulb. 122 is arranged being inclined with respect to the vehicle width direction like this embodiment.

Third Embodiment

Next, referring to FIGS. 11 to 14F, a vehicle headlamp of a third embodiment of the present invention will be explained below.

Figure 11:
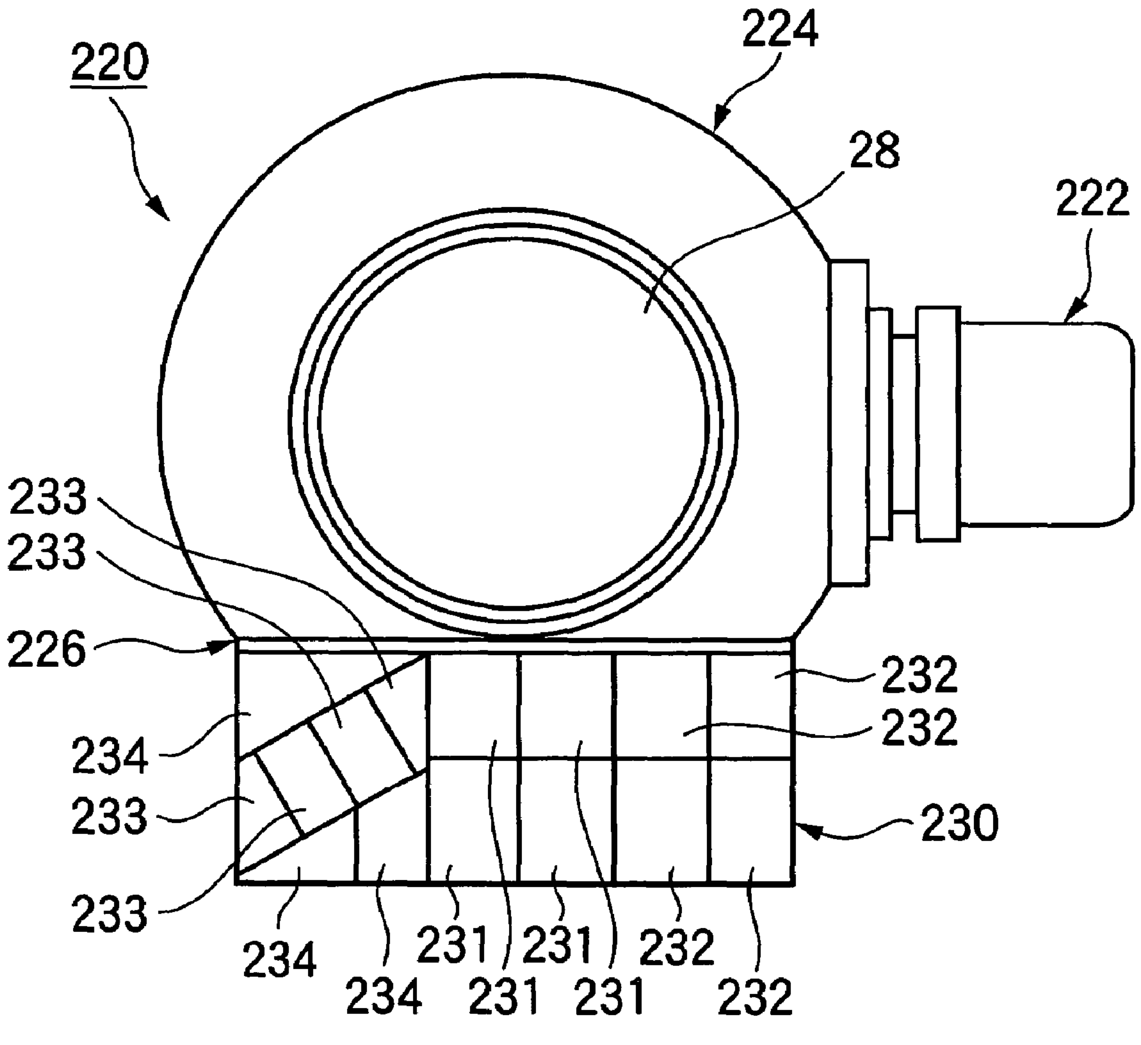
FIG. 11 is a front view showing a lighting device unit of a third embodiment of the present invention.
Figure 12:
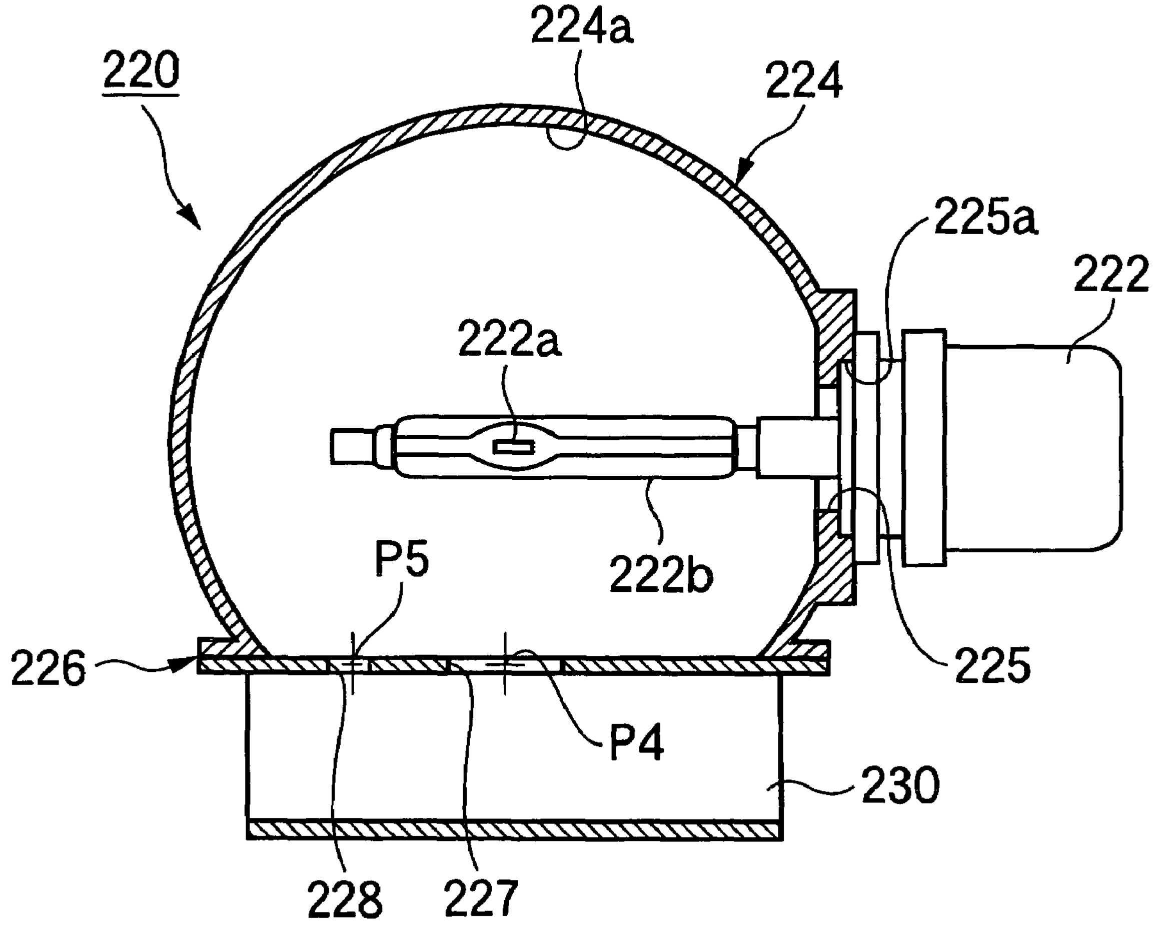
FIG. 12 is a laterally sectional view showing the lighting device unit of the third embodiment.
Figure 13:
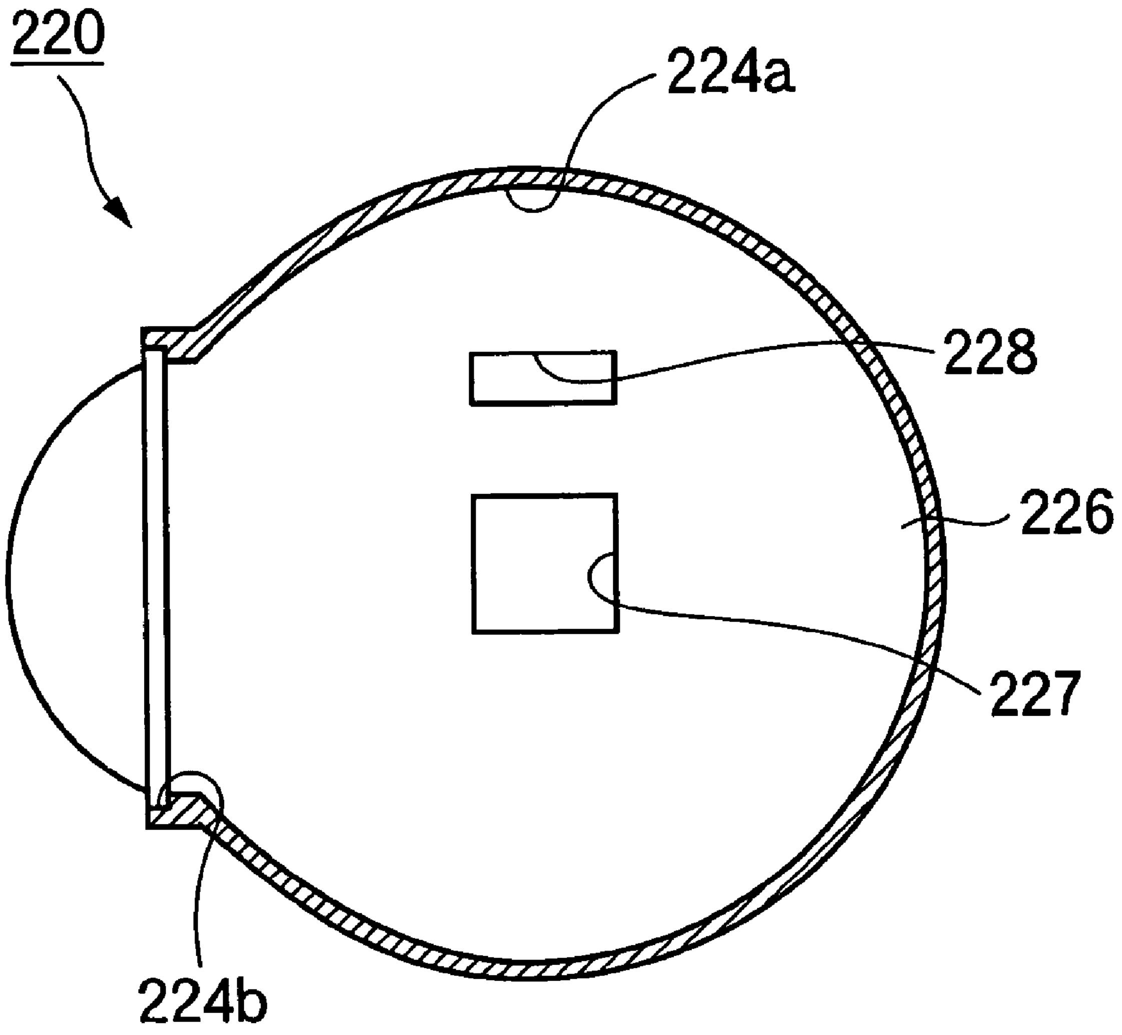
FIG. 13 is a horizontally sectional view showing the lighting device unit of the third embodiment.

FIG. 11 is a front view of the lighting device unit of the present embodiment, FIG. 12 is a laterally sectional view of the lighting device unit of the present embodiment, FIG. 13 is a horizontally sectional view of the lighting device unit of the present embodiment, and FIGS. 14A to 14F are schematic illustrations showing a light distribution pattern projected to the front side. Except for the structure of the reflector, the reflector support member and the sub-reflector, the vehicle headlamp of this embodiment is essentially the same as that of the first and the second embodiment. In order to avoid the duplication, like reference characters are used to indicate like parts in the first, the second and the third embodiment.

Instead of the reflector 24 and the reflector support member 26 of the first embodiment, the vehicle headlamp of the present embodiment includes a lighting device unit 220 having a reflector 224 and a reflector support member 226.

The reflector 224 is a reflecting member having a substantially ellipsoidal reflecting face 224*a* inside. The reflector 224 reflects light, which is emergent from the light source 222*a* of the light source bulb 222 provided inside the reflector 224, by the reflecting face 224*a* on the inner diameter side. In the reflector 224, the opening 224*b*, the sectional shape of which is substantially circular, is formed on the front side. The projection lens 28 is attached to the reflector 224 so that this opening 224*b* can be covered with the projection lens 28.

As shown in FIG. 12, on the side wall of the reflector 224, the attaching hole 225 for attaching the light source bulb 222 is formed. The attaching hole 225 is formed penetrating the reflector 224 from the outer diameter side to the inner diameter side of the reflector 224. The light source bulb 222 is inserted from the outside of the reflector 224 to the inside reflecting face 224*a* side through the attaching hole 225. The light source bulb 222 is fixed to the holder 225*a* formed in the periphery of the attaching hole 225. In this connection, in the light source bulb 222 of the present embodiment, the shade may not be provided on the glass tube 222*b*. Further, the light source bulb 222 of the present embodiment may be provided with the same shade as the shade 123 formed on the light source bulb 122 of the second embodiment.

The reflector support member 226 is provided in a lower portion of the reflector 224. The reflector support member 226 is fixed to a lower end face of the reflector 224 in such a manner that the reflector support member 226 closes a lower portion of the reflector 224 with the base body 226*a*, the shape of which is formed into a substantially elliptical plate shape corresponding to the lower end face of the reflector 224. The sub-reflector 230 protruding from the base body 226*a* is formed below the reflector support member 226 being integrated with the reflector support member 226.

The sub-reflector 230 is a reflecting member for reflecting light, which has been reflected by the reflecting face 224*a* of the reflector 224, to the front side. As shown in FIG. 13, the first opening 227 is formed in the base body 226*a* of the reflector support member 226. Further, in the base body 226*a* of the reflector support member 226, the second opening 228 is formed being separate from the first opening 227.

The reflecting face 224*a* of the reflector 224 is divided into the first reflecting region and the second reflecting region, that is, one portion of the reflecting face 224*a* is the first reflecting region for reflecting light to the fourth focus P4 provided in the vicinity of the first opening 227 and the other portion of the reflecting face 224*a* is the second reflecting region for reflecting light to the fifth focus P5 provided in the vicinity of the second opening 228. That is, the first reflecting region composes an elliptical reflecting optical system in which the light source 222*a* is one focus and the fourth focus P4 is the other focus. The second reflecting region composes an elliptical reflecting optical system in which the light source 222*a* is one focus and the fifth focus P5 is the other focus. The reflecting face 24*a* can be arbitrarily divided into the first reflecting region and the second reflecting region. For example, the reflecting face 24*a* may be divided into two reflecting regions by a certain boundary. Light reflected on the reflecting face 24*a* of the reflector 24 passes through the first opening 227 or the second opening 228 and is incident upon the sub-reflector 230 and reflected to the front side by the sub-reflector 230.

As shown in FIG. 11, the sub-reflector 230 has a plurality of reflecting faces 231 to 234. In this case, the same numeral is attached to the reflecting face, the function of which is the same. In this embodiment; light which has passed through the first opening 227 is incident upon the reflecting faces 231 and 232, and light which has passed through the second opening 228 is incident upon the reflecting faces 233 and 234.

Four reflecting faces 231 arranged on the central side project light under the condition that light is somewhat diffused to the front side. The light distribution pattern, which is made by the four reflecting faces 232 provided on one side of the reflecting face 231 being adjacent, is overlapped on the light distribution pattern formed by the reflecting faces 231. On these two light distribution patterns, the light distribution pattern, which is made by the reflecting faces 233 and 234 being adjacent onto the other side of the reflecting face 231, is further overlapped.

The reflecting face 233 is arranged forming an angle with respect to the reflecting faces 231 and 232. The reflecting face 234 is formed in such a manner that an upper and a lower portion of the reflecting face 233 are filled by the reflecting face 234. The reflecting face 233 is a reflecting face for forming an inclined portion on the cutoff line. An image of the light source 222*a*, a portion of which is shaded, is incident upon the reflecting face 233 through the second opening 228. When the image is obliquely incident to the front side, an inclined portion can be formed.

Explanations will be specifically made into a light distribution pattern formed by this lighting device unit 220.

Figure 14A:
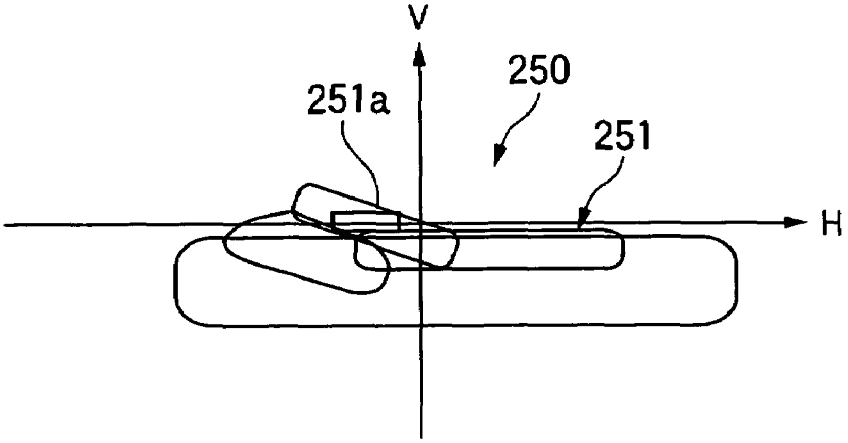
FIG. 14A is a schematic illustration showing an overall light distribution pattern projected to a front side from the lighting device unit of the third embodiment.

In this embodiment, as shown in FIGS. 14B to 14F, the entire light distribution pattern 250 shown in FIG. 14A is formed mainly by five light distribution patterns 241 to 245 shown in FIGS. 14B to 14F.

Figure 14B:
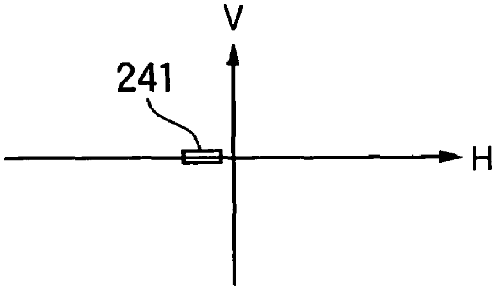
FIG. 14B is a schematic illustration showing a first light distribution pattern projected to the front side from the lighting device unit of the third embodiment.

First of all, the first light distribution pattern 241 shown in FIG. 14B is formed by light which is emergent from the light source 222*a* and directly incident upon the projection lens 28 and projected to the front side. This first light distribution pattern 241 is irradiated right above the horizontal line H crossing it and a hot zone is formed. Since light emitted by the light source 22*a* is incident upon the projection lens 28 without the attenuation of luminous intensity, the maximum luminous intensity of this light distribution pattern 241 is so high and it is 10000 to 100000 cd at the maximum. Therefore, the condensed light for enhancing the brightness of the hot zone is made.

Figure 14C:
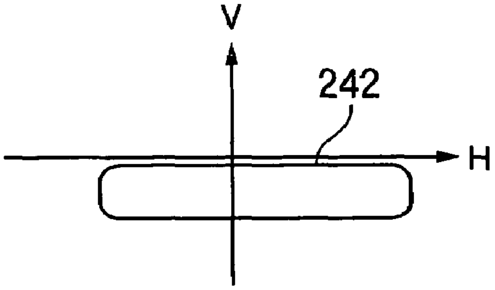
FIG. 14C is a schematic illustration showing a second light distribution pattern projected to the front side from the lighting device unit of the third embodiment.

Next, the second light distribution pattern 242 shown in FIG. 14C is formed by light irradiated by the reflecting face 231 of the sub-reflector 230. The reflecting face 231 of the sub-reflector 230 is formed into a face shape, the diffusion ratio of which is high so that the light can be diffused under the cutoff line and a large light distribution pattern can be formed. Due to the foregoing, the second light distribution pattern 242 is formed into a light distribution pattern spreading in the width direction in a portion lower than the cutoff line 251.

Figure 14D:
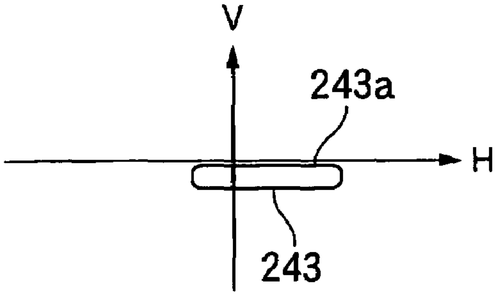
FIG. 14D is a schematic illustration showing a third light distribution pattern projected to the front side from the lighting device unit of the third embodiment.

Next, the third light distribution pattern 243 shown in FIG. 14D is formed by the light irradiated by the reflecting face 232 of the sub-reflector 230. The diffusion ratio of the reflecting face 232 of the sub-reflector 230 is set at a value lower than the diffusion ratio of the reflecting face 231. Further, the upper edge 243*a* forms a portion (the right side) of the cutoff line 252 of the entire light distribution pattern 250.

Figure 14E:
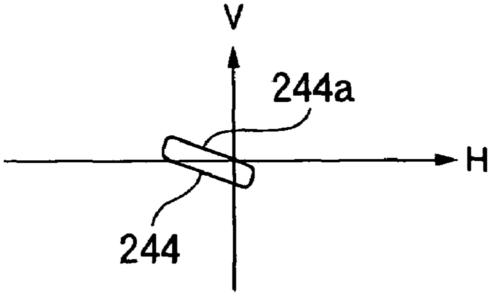
FIG. 14E is a schematic illustration showing a fourth light distribution pattern projected to a front side from the lighting device unit of the third embodiment.

Next, the fourth light distribution pattern 244 shown in FIG. 14E is formed by light irradiated by the reflecting face 233 of the sub-reflector 230. In the light distribution pattern formed by the reflecting face 233, the upper end edge is obliquely inclined. This upper end edge 234*a* forms an inclined portion 251*a* of the cutoff line 251 of the entire light distribution pattern 250. That is, the reflecting face 233 is composed as an oblique cutoff line forming face which forms the inclined portion 251*a* of the cutoff line 251.

Figure 14F:
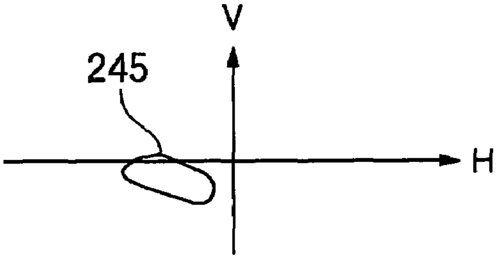
FIG. 14F is a schematic illustration showing a fifth light distribution pattern projected to a front side from the lighting device unit of the third embodiment.

Next, the fifth light distribution pattern 245 shown in FIG. 14F is formed by light irradiated by the reflecting face 234 of the sub-reflector 230. The reflecting face 234 of the sub-reflector 230 irradiates light so that a gap formed between the fourth light distribution pattern 244 and the second light distribution pattern 242 can be filled with irradiated light, that is, a portion of a low quantity of light can be eliminated.

As described above, in the present embodiment, when the first to the fifth pattern 241 to 245 are overlapped on each other, the light distribution pattern 250 shown in FIG. 14A is formed. In this light distribution pattern 50, the clear cutoff line 251 having the inclined portion 251*a* is formed by the upper end edge 243*a* of the third light distribution pattern 243 and the upper end edge 244*a* of the fourth light distribution pattern 244. A quantity of light in the vicinity of the inclined portion 251*a* is enhanced by the first light distribution pattern 241. Therefore, the visibility to visualize a distant object can be enhanced.

As explained above, the inclined portion of the cutoff line may be formed by the reflecting face of the sub-reflector 230. When the inclined portion of the cutoff line is formed, as described above, it becomes possible to provide a vehicle headlamp capable of forming a light distribution pattern having a cutoff line provided with an inclined portion without using a special light source bulb or paying attention to an attaching angle of the light source bulb.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle headlamp comprising:

a light source bulb including a light source for emitting light;

a reflector which reflects the light from the light source;

a sub-reflector which reflects light, which has been reflected by the reflector, onto a front side;

a projection lens which directly projects the light from the light source onto the front side; and a shade which shades a part of the light emitted by the light source, provided on the light source bulb, wherein the shade is arranged in a vicinity of a rear side focus of the projection lens, and wherein the shade includes an inclined portion corresponding to a shape of an inclined portion on a cutoff line of a light distribution pattern projected onto the front side.

2. The vehicle headlamp according to claim 1, wherein the light source is positioned on a central axis of the projection lens.

3. The vehicle headlamp according to claim 1, further comprising:

a reflector support member provided in a lower portion of the reflector; and an opening formed in the reflector support member, wherein a reflecting face of the reflector has a first focus at a position in a vicinity of the light source and a second focus in a vicinity of the opening.

4. The vehicle headlamp according to claim 1, wherein the sub-reflector has an oblique cutoff line formation face for forming an inclined portion on a cutoff line, which is projected onto the front side, by obliquely reflecting an image of the light source.

5. The vehicle headlamp according to claim 4, further comprising:

a reflector support member provided in a lower portion of the reflector; and a first and a second openings formed in the reflector support member, wherein a reflecting face of the reflector includes a first reflecting region having a focus in a vicinity of the first opening, and a second reflecting region having a focus in a vicinity of the second opening.

6. A vehicle headlamp comprising:

a light source bulb including a light source for emitting light;

a reflector which reflects the light from the light source;

a sub-reflector which reflects light, which has been reflected by the reflector, onto a front side;

a projection lens which directly projects the light from the light source onto the front side; and a shade which shades a part of the light emitted by the light source, provided on the light source bulb, wherein a longitudinal direction of the light source bulb is substantially parallel with a width direction of a vehicle.

7. The vehicle headlamp according to claim 6, wherein the light source is positioned on a central axis of the projection lens.

8. The vehicle headlamp according to claim 6, further comprising:

a reflector support member provided in a lower portion of the reflector; and an opening formed in the reflector support member, wherein a reflecting face of the reflector has a first focus at a position in a vicinity of the light source and a second focus in a vicinity of the opening.

9. The vehicle headlamp according to claim 6, wherein the sub-reflector has an oblique cutoff line formation face for forming an inclined portion on a cutoff line, which is projected onto the front side, by obliquely reflecting an image of the light source.

10. The vehicle headlamp according to claim 9, further comprising:

a reflector support member provided in a lower portion of the reflector; and a first and a second openings formed in the reflector support member, wherein a reflecting face of the reflector includes a first reflecting region having a focus in a vicinity of the first opening, and a second reflecting region having a focus in a vicinity of the second opening.

11. A vehicle headlamp comprising:

a light source bulb including a light source for emitting light;

a reflector which reflects the light from the light source;

a sub-reflector which reflects light, which has been reflected by the reflector, onto a front side;

a projection lens which directly projects the light from the light source onto the front side; and a shade which shades a part of the light emitted by the light source, provided on the light source bulb, wherein the light source bulb is arranged being inclined with respect to the vehicle width direction.

12. The vehicle headlamp according to claim 11, wherein a longitudinal direction of the light source bulb is inclined to an upper side at a predetermined angle with respect to a horizontal face including the vehicle width direction, and the predetermined angle corresponds to an angle of inclination of an inclined portion on a cutoff line of a light distribution pattern projected onto the front side.

13. The vehicle headlamp according to claim 11, wherein the light source is positioned on a central axis of the projection lens.

14. The vehicle headlamp according to claim 11, further comprising:

a reflector support member provided in a lower portion of the reflector; and an opening formed in the reflector support member, wherein a reflecting face of the reflector has a first focus at a position in a vicinity of the light source and a second focus in a vicinity of the opening.

15. The vehicle headlamp according to claim 11, wherein the sub-reflector has an oblique cutoff line formation face for forming an inclined portion on a cutoff line, which is projected onto the front side, by obliquely reflecting an image of the light source.

16. The vehicle headlamp according to claim 15, further comprising:

a reflector support member provided in a lower portion of the reflector; and a first and a second openings formed in the reflector support member, wherein a reflecting face of the reflector includes a first reflecting region having a focus in a vicinity of the first opening, and a second reflecting region having a focus in a vicinity of the second opening.

* * * * *